(No Model.)
F. W. MEYER.
SLEIGH.
No. 387,528. Patented Aug. 7, 1888.
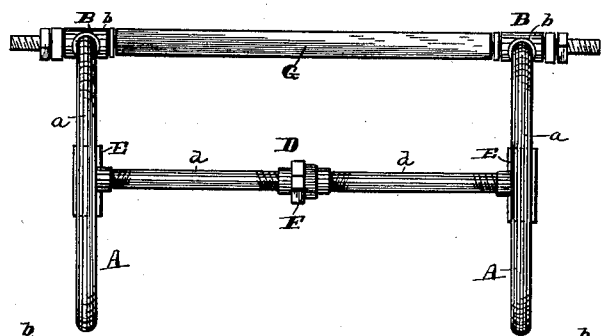
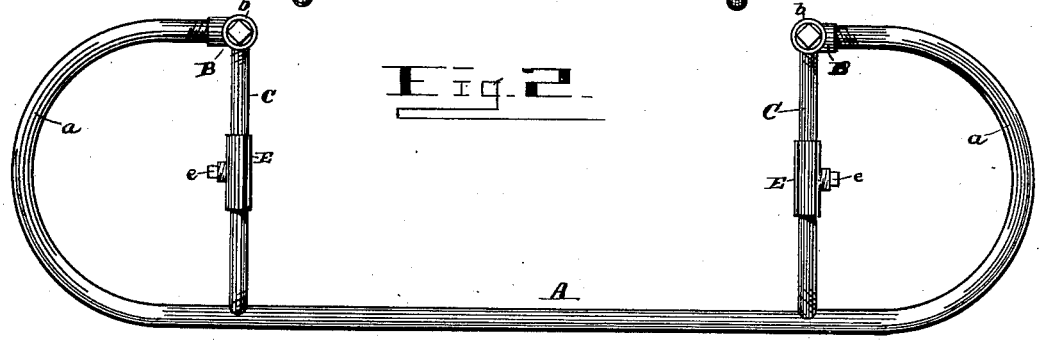
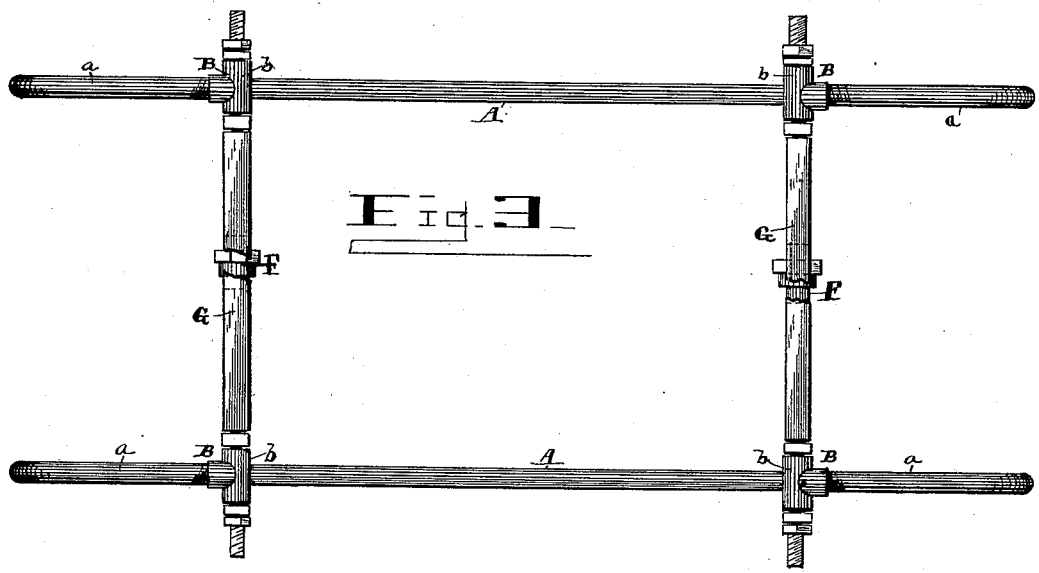
Witnesses,
P. L. Brooks,
A. E. Towell.
Inventor,
F. W. Meyer,
By his Attorney
J. A. Alexander.

UNITED STATES PATENT OFFICE.

FRED WILLIAM MEYER, OF LOUISVILLE, KENTUCKY.

SLEIGH.

SPECIFICATION forming part of Letters Patent No. 387,528, dated August 7, 1888.

Application filed April 11, 1888. Serial No. 270,315. (No model.)

*To all whom it may concern:*

Be it known that I, FRED WILLIAM MEYER, of Louisville, in the county of Jefferson and State of Kentucky, have invented certain new and useful Improvements in Sleighs; and I do hereby declare that the following is a full, clear, and exact description thereof, reference being had to the accompanying drawings, and to the letters of reference marked thereon, which form part of this specification, in which—

Figure 1 is a front view of my improved sleigh-runner gear. Fig. 2 is a side view of the same. Fig. 3 is a top plan view of the same.

This invention in an improvement in sleighs, and its objects are to provide an improved runner-frame, which is provided with suitable joints, whereby, if desired, it can be readily attached to the axles of a vehicle, so as to form with the latter a comfortable sleigh; and it consists in the novel construction and arrangement of parts of the runner-frame, that are hereinafter clearly explained, and concisely stated in the claims.

Referring to the drawings by letters, A A represent two runners, each formed of a continuous piece of metal piping curved upward and inward at the ends, as shown at *a a*, and having on their extremities the metal T pipe-joints B B, the heads *b* of which stand at right angles to the body of the runner, as shown.

C C are vertical pipe-standards supporting the curved ends *a* of runners A on the main body of the runners, and preferably connected by screw-thread joints, as shown.

D D represent sectional vertically-adjustable braces, also formed of pipe and connected to sliding T-joints E E on the adjoining standards C C of the runners. The adjoining ends of the sections *d* of braces D are connected by a turn-buckle or screw-coupling, F, which will keep the sections rigid with each other, but permit the length of the braces to be varied. The joints E E fit loosely on standards C C, permitting the braces D to be raised or lowered thereon, as desired, and they can be set and secured in any position by means of set-screws *e e*, as shown.

In the drawings I have represented the runners attached to the axles G of a vehicle. To do this the wheels are first removed from the vehicle, the braces D lengthened, separating runners A until their joints B B can be slipped on the axle-skeins, occupying the place of the wheels. Braces D are then shortened sufficiently to bring the runners properly below the axle, and washers are slipped on the skeins outside joints B, and the nuts replaced, binding the joints firmly thereon and keeping the runners rigid with the axle. The runners are thus easily applied to a vehicle-body, and can be removed with equal facility. Where the runners are to be used in making an ordinary sleigh a connecting-bar can be employed in place of axles G.

By making the entire runner-gear of metal pipe I attain great strength and lightness, and by reason of the adjustable screw-threaded joints the runner-gear can be quickly set up or taken apart for storage, transportation, or repairs, and is applicable to varying sizes or widths of vehicles.

In some instances the runner-gear might be permanently attached to the axles, the skeins projecting beyond joints B to receive the wheels, so that by removing the wheels the vehicle is supported on the runners, and when the wheels are replaced the runners are suspended from the axles.

Having described my invention, I claim—

1. The combination, in a sleigh, of a pair of runners and upright standards secured thereto, with vertically-adjustable braces mounted on and connecting said standards by means of adjustable T-joints, all substantially as and for the purpose described.

2. The combination of the runners and their standards, substantially as described, with the adjustable T-joints on said standards and the vertically-adjustable braces united to said joints, and each made in two parts united by a screw-coupling, substantially as described.

3. The combination of the continuous pipe-runners and their uprights with the vertically-adjustable sectional braces and the adjustable connections of said braces to the uprights, and the connecting bars or axles above said braces, all substantially as and for the purpose described.

4. The combination of the axles G with the continuous runners A A, their uprights C, and the vertically-adjustable braces D, composed of sections $d\,d$, screw-coupling F, and the sliding T-joint E on the ends of the braces, and their set-screws $e$, all constructed and arranged substantially as and for the purpose described.

In testimony that I claim the foregoing as my own I affix my signature in presence of two witnesses.

FRED WILLIAM MEYER.

Witnesses:
 AUGUSTUS HENRY MARRET, Jr.,
 EMIL S. HELBURN.